United States Patent Office 3,201,220
Patented Aug. 17, 1965

3,201,220
HERBICIDAL COMPOSITION AND METHOD
Herbert H. Harris, Painesville, and Arthur L. Galloway, Mentor, Ohio, Lawrence E. Limpel, Yonkers, N.Y., and Paul H. Schuldt, Mentor, Ohio, assignors to Diamond Alkali Company, Cleveland, Ohio, a corporation of Delaware
No Drawing. Filed Jan. 29, 1962, Ser. No. 169,680
4 Claims. (Cl. 71—2.6)

This invention relates to improvements in biologically active materials and more particularly to improved compositions and to methods for controlling plant growth.

This is a continuation-in-part of our copending application Serial No. 100,515, filed April 4, 1961, now abandoned.

More specifically, this invention relates to plant growth regulants, i.e., herbicidal compositions containing as an active ingredient a mixture of dimethyl 2,3,5,6-tetrahaloterephthalate, preferably dimethyl 2,3,5,6-tetrachloroterephthalate, and one or more other herbicides, insecticides, nematocides or fungicides and preferably other herbicides.

Up to this time many substances both organic and inorganic have been proposed and used as herbicides. However, the problem of controlling undesirable plant growth still persists. Selectively controlling undesirable plant growth is becoming increasingly important for more effective land utilization and production. Accordingly, while a large number of herbicides have heretofore been proposed and have enjoyed varying degrees of commercial success, the problem of selectively controlling plant growth remains a troublesome and increasingly important one.

Illustrative of prior herbicidal materials are such organic substances as 2,4-D and 2,4,5-T, carbamates, such as isopropyl N-(3-chlorophenyl) carbamate, pentachlorophenol, 2,2-dichloropropionic acid and the like. Inorganic materials such as borax, salt, arsenate, arsenite, cyanate, chlorate, sulfamate, etc., also have been proposed and used. In many instances these materials are satisfactory in specific applications. In other applications, however, they have not been entirely suitable. Many of the more effective organic herbicides heretofore proposed have involved problems as to methods of application; have been non-selective, thus killing both desirable and undesirable plant growth; or have involved the use of materials which are so phytotoxic as to endanger adjoining areas. On the other hand, many of the inorganic substances, such as borax or salt, while more economical, in many instances are relatively inefficient. In addition, such compounds at times are non-selective and so toxic as to sterilize soil for extended periods when such action is not desired.

Dimethyl 2,3,5,6-tetrachloroterephthalate, on the other hand, is very selective in most applications and particularly when used with farm or agronomic crops. This compound is highly effective against such grasses as crab grass, love grass, witch grass, foxtail and fall panicum. Certain broadleaved weeds, such as lambs-quarters, alfilaria, carpet weed, purslane and common chickweed are highly susceptible to applications of this material while other broadleaved weeds, e.g., velvet leaf, ragweed, mustards, jimson weed, and smartweed are quite resistant, i.e., these latter broadleaved weeds generally are not controlled by a moderate application of material. Also, dimethyl 2,3,5,6-tetrachloroterephthalate is primarily a pre-emergence herbicide having little post-emergence effect on most crops and weeds.

Accordingly, it is an object of this invention to provide new and improved selective plant growth regulating compositions which not only are economical to produce and use but which are singularly effective.

A further object of this invention is the provision of new and improved herbicidal compositions and methods for controlling plant growth.

A still further object of this invention is to provide new and improved plant growth regulating compositions containing a mixture of dimethyl 2,3,5,6-tetrahaloterephthalate, preferably dimethyl 2,3,5,6-tetrachloroterephthalate, together with another biologically active material.

These and other objects and advantages of the invention will appear more fully from the following description hereinafter set forth.

The present invention comprises a biologically active composition of matter containing a carrier, an active amount of dimethyl 2,3,5,6-tetrachloroterephthalate and an active amount of another compatible biologically active material. The additional material may be a herbicide which together with the dimethyl 2,3,5,6-tetrachloroterephthalate would produce a synergistic effect in regulating or destroying undesirable plant growth namely weeds, i.e., plants which are growing out of place. The added herbicide can also be one which is highly effective against those weeds which are resistant to dimethyl 2,3,5,6-tetrachloroterephthalate and the resultant composition would thus be effective against a much wider spectrum of weeds. Also the added material could be a post-emergence herbicide thus providing both pre-emergence and post-emergence treatment with a single composition.

The biologically active composition of this invention may also contain, either in addition to or in place of the added herbicide, such materials as insecticides, nematocides, and/or fungicides which will provide protection against insects, fungi, nematodes and weeds.

The following materials are examples of herbicides which are primarily employed in post-emergence treatment, i.e., the herbicide is effective on the crop or weed after it has emerged from the soil. These materials can be mixed with dimethyl 2,3,5,6-tetrachloroterephthalate in order to control a wider spectrum of weeds and to provide both pre-emergence and post-emergence control.

| Designation | Active Ingredient |
|---|---|
| DNBP | 4,6-dinitro-o-sec-butyl-phenol. |
| 2,4,5-T | 2,4,5-trichlorophenoxy acetic acid. |
| Silvex | 2-(2,4,5-trichlorophenoxy) propionic acid. |
| Amitrol | 3-amino-1,2,4-triazole. |
| MCPA | 2-methyl-4-chlorophenoxy acetic acid. |
| MCPB | 4-(2-methyl-4-chlorophenoxy) butyric acid. |
| Dicryl | N-(3,4-dichlorophenyl) methyl acrylamide. |
| Karsil | N-(3,4-dichlorophenyl)-2-methylpentanamide. |
| Stoddard Solvent | A hydrocarbon petroleum fraction. |
| Stam F-34 | 3,4-dichloropropionanilide. |
| DMA | Disodium monomethylarsonate. |
| PMA | Phenyl mercuric acetate. |
| KOCN | Potassium cyanate. |
| HCA | Hexachloroacetone. |
| Solan | N-3-chloro-4-methylphenyl-2-methylpentanamide. |

Herbicides which produce a synergistic pre-emergence herbicidal effect when employed with 2,3,5,6-tetrachloroterephthalate are as follows:

| Designation | Active Ingredient |
|---|---|
| 2,4-D | 2,4-dichlorophenoxy acetic acid. 2,4,5-trichlorobenzylpropionate. |
| Alanap | N-1-naphthylphthalamic acid. |

In compositions containing either of these materials in admixture with dimethyl 2,3,5,6-tetrachloroterephthalate, the ratios of the ingredients will be such that the materials are mutually activating, i.e., the results obtained by the mixture will be greater than the additive results of the two materials when employed separately.

Other herbicides which may be employed with dimethyl 2,3,5,6-tetrachloroterephthalate are:

| Designation | Active Ingredient |
| --- | --- |
| CDEC | 2-chloroallyl diethyl dithiocarbamate. |
| Amiben | 3-amino 2,5-dichlorobenzoic acid. |
| CIPC | Isopropyl-N-(3-chlorophenyl) carbamate. |
| Atrazine | 2-chloro-4-(ethylamino)-6-(isopropylamino)-s-triazine. |
| Diuron | 3-(3,4-dichlorophenyl)-1,1-dimethylurea. |
| Sodium PCP | Sodium salt of pentachlorophenol. |
| Sesone | Sodium 2-(2,4-dichlorophenoxy) ethyl sulfate. |
| Fenac | 2,3,6-trichlorophenylacetic acid (sodium salt). |
| Simazine | 2-chloro-4,6-bis(ethylamino)-s-triazine. |
| Neburon | 1-n-butyl-3-(3,4-dichlorophenyl)-1-methyl-urea. |
| Monuron | 3-(p-chlorophenyl)-1,1-dimethylurea. |
| Dalapon | 2,2-dichloropropionic acid. |
| Fenuron | 3-(phenyl)-1,1-dimethyl urea. |
| Eptam | Ethyl-N,N-di-n-propyl thiolcarbamate. |
| Erbon | 2-(2,4,5-trichlorophenoxy)ethyl-2,2-dichloropropionate. |
| Falone | Tris-(2,4-dichlorophenoxy ethyl) phosphite. |
| IPC | Isopropyl-N-phenylcarbamate. |
| Dipan | Diphenyl acetonitrile. |
| Zytron | O-2,4-dichlorpheny O-methyl isopropyl phosphoro amido thioate. |
| Propazine | 2-chloro-4,6-bis(isopropylamino)-s-triazine. |
| Trietazine | 2-chloro-4-(ethylamino)-6-(diethylamino)-s-triazine. |
| Ipazine | 2-chloro-4-(diethylamino)-6-(isopropyl amino)-s-triazine. |
| MH | 1,2-dihydro-pyridazine-3,6-dione. |
| Novon | 2-(2,4,5-trichlorophenoxy)ethyl 2,2-dichloropropionate. |
| R-2061 | Propyl ethyl-n-butylthiol carbamate. |
| CDAA | 2-chloro-N,N-diallylacetamide. |
| TCA | Trichloroacetic acid. |
| TBA | 2,3,6-trichlorobenzoic acid. |
| Banvel D | 2-methoxy-3,6-dichlorobenzoic acid. |
| Banvel T | 2-methoxy-3,5,6-trichlorobenzoic acid. |
| Casoron | 2,6-dichlorobenzonitrile. |

Compositions containing the following materials in admixture with dimethyl 2,3,5,6-tetrachloroterephthalate provide insecticidal as well as herbicidal control of plant pests and weeds.

A composition of matter containing the material bearing the trade name Nemagon (1,2-dibromo-3-chloropropane) together with dimethyl 2,3,5,6-tetrachloroterephthalate will afford protection against nematode infestation as well as against undesirable grasses and some broadleaf weeds.

| Designation | Active Ingredient |
| --- | --- |
| Toxaphene | Chlorinated camphene-chlorine content of 67% to 69%. |
| DDT | 1,1,1-trichloro-2,2-bis(p-chlorophenyl) ethane. |
| Aldrin | 1,2,3,4,10,10-hexachloro-1,4,4a,5,8,8a-hexahydro-1,4-endoexo-5-8-dimethanonaphthalene. |
| Heptachlor | 1,4,5,6,7,8,8-heptachloro-3a,4,6,6a-tetrahydro-4,7-methanoindene. |
| Dieldrin | 1,2,3,4,10,10-hexachloro-6,7-epoxy-1,4,4a,5,6,7,8,8a-octahydro-1,4-endoexo-5,8-dimethanonaphthalene. |
| Endrin | 1,2,3,4,10,10-hexachloro-6,7-epoxy-1-4,4a,5,6,7,8,8a-octahydro-1,4-endoendo-5,6-dimethanonaphthalene. |
| Chlordane | 1,2,4,5,6,7,8,8a-octachloro-4,7-methano-3a,4,7,7a-tetrahydroindane. |
| Thimet | o,o-Diethyl (s-ethyl mercaptoethyl) phosphoro dithiophosphate. |
| Disyston | o,o-Diethyl-s-2(ethylthio)ethyl phosphorodithioate. |

Biologically active compositions containing mixtures of dimethyl 2,3,5,6-tetrachloroterephthalate and one or more of the following materials will protect plants and crops against plant fungi as well as the undesirable crops and weeds which are susceptible to the herbicidal ingredients.

| Designation | Active Ingredient |
| --- | --- |
| Captan | N-(trichloromethylthio)-4-cyclohexene-a,2-dicarboximide. |
| Mylone | 3,3,4,4-tetrachlorotetrahydrothiophene-1,1-dioxide. 3,5-dimethyl-1,3,5,2H-tetrahydrothia-diazine-2-thione. |
| Tersan | Tetramethylthiuram disulfide. |
| C531 | Cadmium, copper, zinc, calcium chromate complex. |
| Kromad | Cadmium, sebacate, potassium chromate, malachite green, thiram. |
| Caddy | Cadmium chloride. Trichlorobenzyl chloride. Ethyl mercury-p-toluene sulfanilamide. |
| Actidione | Cycloheximide. Cyanomethyl mercury guanidine. |

It is recognized that while any material within a particular category, i.e., fungicides, post-emergence herbicides, etc., will have the same general effect as any other material in the same category, the degree of effectiveness of the various materials within the category will vary.

It will be understood, of course, that the composition of this invention containing dimethyl 2,3,5,6-tetrachloroterephthalate in admixture with another biologically active material may be utilized in diverse formulations including dusts, wettable powders and granular materials as well as liquids, such as solutions, concentrates, emulsifiable concentrates, slurries and the like, depending upon the application intended and the formulation media desired.

Thus, it will be appreciated that the biologically active compositions of this invention containing a mixture of dimethyl 2,3,5,6-tetrachloroterephthalate and other herbicides, fungicides and the like, may be employed to form biologically active substances containing such compounds as essential active ingredients, which compositions may also include finely divided dry or liquid diluents, extenders, fillers, conditioners, including various clays, diatomaceous earth, talc, spent catalyst, aluminum, silicates, liquids, solvents, diluents, etc., including water and various organic liquids such as kerosene, petroleum fractions, benzene, toluene, xylol, chlorinated benzene, chlorinated naphthalene, acetone, cyclohexanone, carbon disulfide, alcohols and various mixtures thereof.

When liquid formulations are employed or dry materials prepared which are to be used in liquid form it is desirable in certain instances additionally to employ a minor amount of a wetting, emulsifying, dispersing or other surface active agent to facilitate use of the formulation, e.g., Triton X–155 (alkyl aryl polyether alcohol, U.S. Patent 2,504,064), cationic quarternary ammonium salts and alkyl aryl sulfonates.

The term "carrier" as employed is intended to refer broadly to materials constituting a major proportion of a biologically active formulation and hence includes finely-divided materials, both liquids and solids, as aforementioned generally used in such applications.

The biologically active compositions of the invention provide effective control of undesired weeds in agronomic crops, e.g., soybeans, field corn, cotton, rice and alfalfa; vegetable crops, e.g., lima and snap beans, carrots, corn, onion, sweet potato, pepper, tomato and cabbage; fruits, e.g., strawberries and brambles; seedling fruit trees; ornamentals, e.g., flowers, shrubs and trees.

The biologically active materials herein disclosed may be applied to plants in various manners. Perhaps the most desirable method of application is by means of a single formulation containing dimethyl 2,3,5,6-tetrachloroterephthalate plus one or more of the other biologically active materials. This formulation may be in the form of a wettable powder and contain in addition to the active ingredients a wetting agent, a dispersing agent and a diluent such as clay. A single formulation such as this can only be prepared if the active ingredients are compatible.

If one of the active ingredients is available only as an emulsifiable concentrate such that a single formulation cannot be made the most common method of application is by means of a tank mix. In this method the dimethyl 2,3,5,6-tetrachloroterephthalate in the form of a wettable powder is mixed with water in a vessel which may be the spray tank or some other container. To this dispersion is added the emulsifiable concentrate of the other active ingredients. The mixing normally is done immediately preceding application of the material and the mix is preferably agitated during the spraying operation. The sequence in which the materials are added may be dictated by the physical and chemical properties and characteristics of the respective ingredients.

If the active ingredients are not compatible or if the area to be treated is small, treatment may be accomplished by multiple application. The order of application is of little importance but one application will be the dimethyl 2,3,5,6-tetrachloroterephthalate, perhaps in the form of a wettable powder, the other active ingredient can be applied to the same area as a dust, spray, or by some other means depending upon the material used.

In order that those skilled in the art may more completely understand the present invention and the preferred method by which the same may be carried into effect, the following specific examples are offered.

EXAMPLE 1.—PREPARATION OF 50% WETTABLE POWDER of DIMETHYL 2,3,5,6-TETRACHLOROTEREPHTHALATE

Parts by weight
Dimethyl 2,3,5,6 - tetrachloroterephthalate (100% active basis) _____ 50.0
Clay (Attaclay, Tako or Pikes Peak) _____ 46.5
Wetting agent—Nacconol SW 40% active (alkyl aryl sulfonate) _____ 2.0
Dispersing agent—Marasperse N (sodium lignosulfonate) _____ 1.5

The above mixture is finely ground in a ball mill, hammer mill, micropulverizer, air mill, roller mill, or the like.

This formulation is a fine powder which readily mixes with water to form a suspension. The material is applied to the desired plants or area by spraying and it is desirable that the suspension be continuously agitated in the spray tank.

EXAMPLE 2.—PREPARATION OF 50% WETTABLE POWDER OF 2,4-D ACID

Parts by weight
Technical 2,4-D acid (98%) _____ 51.5
Wetting agent—Nekal BX78 80% active (sodium alkyl naphthalene sulfonate) _____ 3.0
Dispersing agent—Marasperse N (sodium lignosulfonate) _____ 1.5
Clay (Attaclay) _____ 44.0
Active ingredient 50.5% 2,4-D acid.

This powder may be mixed in the spray tank with a suspension of the wettable powder of Example 1. In such a tank mix the ratios of the active ingredients may be varied to satisfy the particular need.

EXAMPLE 3.—WETTABLE POWDER FORMULATION OF DIMETHYL 2,3,5,6-TETRACHLOROTEREPHTHALATE AND 2,4-D

Parts by weight
Technical 2,4-D acid (98.0%) _____ 8.4
Technical dimethyl 2,3,5,6-tetrachloroterephthlate (86.2%) _____ 47.0
Wetting agent—Nekal BX78 80% active (sodium alkyl naphthalene sulfonate) _____ 3.0
Dispersing agent—Marasperse N (sodium lignosulfonate) _____ 1.5
Clay (Tako) _____ 40.1
Active ingredient 8.2% 2,4-D acid, 40.5% dimethyl 2,3,5,6-tetrachloroterephthalate.

EXAMPLE 4

The wettable powder formulations of Examples 1, 2 and 3, are employed to evaluate their effectiveness as preemergence herbicides on broadleaved weeds and grasses. To evaluate the effect of these formulations upon the germination and subsequent growth of seeds in soil, two mixtures of seed are used. One mixture contains three broadleaved species and the other contains three grass species. Each mixture is planted diagonally in one half of a 9" x 9" x 2" aluminum cake pan filled to within one-half inch of the top with composted greenhouse soil. After planting, the seed is uniformly covered with about ¼" of soil and watered. After 24 hours, water suspensions of each of the formulations of Examples 1, 2 and 3, are sprayed at 10 p.s.i. uniformly over the surface of the pan. The formulations are applied at dosages calculated on an area basis which are equivalent to the number of pounds of active chemical per acre indicated in Table I. The broadleaf seed mixture contains turnip, flax and alfalfa. The grass mixture contains millet, perennial rye grass and timothy. Two weeks after treatment estimates are made on seedling stand and percent control is calculated.

| Wettable Powder | Dosage, lbs./acre | Percent Control Based on Fresh Wgt. | |
|---|---|---|---|
| | | Broadleaved | Grasses |
| Dimethyl 2,3,5,6-tetrachloroterephthalate (Example 1) | 2 | 0 | 41 |
| 2,4-D Acid (Example 2) | 1/3 | 62 | 0 |
| Dimethyl 2,3,5,6-tetrachloroterephthalate (40.2%) plus 2,4-D Acid (8.2%) (Example 3) | 1.6+1/3 | 85 | 41 |

Test results indicate no antagonism between the two materials against grasses and synergism against the broadleaves is evident.

EXAMPLE 5.—WETTABLE POWDER FORMULATION OF 2,4,5-T

Parts by weight
Technical 2,4,5-T acid (98%) _____ 51.5
Wetting agent—Nekal BX78 80% active (sodium alkyl naphthalene sulfonate) _____ 3.0
Dispersing agent—Marasperse N (sodium lignosulfonate) _____ 1.5
Clay (Attaclay) _____ 44.0
Active ingredient 50.5% 2,4,5-T.

This powder may be mixed in the spray tank with a suspension of the wettable powder of Example 1. In such a tank mix the ratios of the active ingredients may be varied to satisfy the particular need.

EXAMPLE 6.—PREPARATION OF 2,4,5-TRICHLOROBENZYLPROPIONATE

Thirty-three grams (0.156 mol) of 2,4,5-trichlorobenzyl alcohol is reacted with 18.5 g. (0.2 mol) of propionyl chloride and 24 g. (0.3 mol) of dry pyridine in 200 ml. of benzene. The flask containing the reaction mixture is initially cooled in a cold water bath to moderate the reaction and then held at room temperature for about 18 hours. The mixture is then mixed with water, the aqueous layer discarded, and the benzene solution layer washed successively with dilute hydrochloric acid and sodium bicarbonate solutions to remove unreacted materials. The benzene solution is dried over $CaCl_2$, and the solvent then removed by distillation at reduced pressure. The residual oil is vacuum distilled to produce 32 g., 78% yield, of an oil boiling at 135°–137° C. at 3 mm. Hg. The analysis of the product $C_{10}H_9Cl_3O_2$, is as follows:

| Element | Calculated, percent by weight | Actual, percent by weight |
|---|---|---|
| C | 44.88 | 44.8 |
| H | 3.39 | 3.5 |

EXAMPLE 7

Field corn is planted with a two-row tractor-mounted corn planter, 40″ between rows. The wettable powder formulation of dimethyl 2,3,5,6-tetrachloroterephthalate of Example 1 is applied by spraying a water dispersion of the material at a rate equivalent to 4 lbs./acre within a portable flexible frame made from rope and wooden doweling 3′ x 15′ anchored over the center of the row. An emulsifiable concentrate of 2,4,5-trichlorobenzylpropionate is formulated in xylene containing 3% Triton X-155. The concentration of active material in the concentrate is 3 lbs./gallon and this is applied to the plot at a rate equivalent to 2 lbs./acre. The dimethyl 2,3,5,6-tetrachloroterephthalate is applied to eight replicate plots. The 2,4,5-trichlorobenzylpropionate is applied to four of the replicate plots which have been treated with dimethyl 2,3,5,6-tetrachloroterephthalate as well as four additional replicate plots. Estimates are made on weed stand 51 days and 64 days after treatment and percent control as calculated based on weed stand in untreated check plots. The check plots are 91% covered by weeds at 51 days and 94% covered at 63 days. The results are set forth in Table II.

*Table II*

| Material | Dosage, lbs./acre | Percentage weed control based on mean of four independent estimates | |
|---|---|---|---|
| | | 51 days | 63 days |
| 2,4,5-trichlorobenzylpropionate | 2 | 2 | 0 |
| Dimethyl 2,3,5,6-tetrachloroterephthalate | 4 | 43 | 39 |
| Dimethyl 2,3,5,6-tetrachloroterephthalate plus 2,4,5-trichlorobenzyl-propionate | 4+2 | 89 | 79 |

A synergistic effect is obtained by the admixture of dimethyl 2,3,5,6-tetrachloroterephthalate and 2,4,5-trichlorobenzylpropionate in the proportions shown.

EXAMPLE 8

In order to determine the effectiveness of dimethyl 2,3,5,6-tetrachloroterephthalate and CIPC [isopropyl-N-(3-chlorophenyl) carbamate] in controlling weeds in strawberry beds the wettable powder formulation of dimethyl 2,3,5,6-tetrachloroterephthalate set forth in Example 1 is applied to replicate 4′ x 10′ plots of strawberries which had been started approximately 6 to 8 months prior to treatment. This formulation is applied at a rate equivalent to 12 lbs./acre to four replicate plots and at a rate equivalent to 8 lbs./acre to four replicate plots. CIPC which is available as an emulsifiable concentrate containing 4 lbs. of active material per gallon is applied to four replicate plots at a rate equivalent to 1.5 lbs./acre. A tank mix of the wettable powder formulation of dimethyl 2,3,5,6-tetrachloroterephthalate and the emulsifiable concentrate of CIPC is prepared in the ratio of 8 lbs. dimethyl 2,3,5,6-tetrachloroterephthalate to 1.5 lbs. of CIPC. This tank mix is applied to four replicate plots at 8 lbs./acre dimethyl 2,3,5,6-tetrachloroterephthalate and 1½ lbs./acre of CIPC. Major weeds in this area include galinsoga, purslane and crabgrass. Estimates are made on weed stand in the strawberry beds 60 days after treatment and percent control is calculated based on weed stand in untreated check plots. The check plots are 81% covered by weeds. The results are set forth in Table III.

*Table III*

| Material | Dosage, lbs./acre | Percent weed control based on mean of six independent estimates |
|---|---|---|
| Dimethyl 2,3,5,6-tetrachloroterephthalate | 12 | 59 |
| Dimethyl 2,3,5,6-tetrachloroterephthalate | 8 | 54 |
| CIPC | 1.5 | 63 |
| Dimethyl 2,3,5,6-tetrachloroterephthalate plus CIPC | 8+1.5 | 80 |

The mixture of dimethyl 2,3,5,6-tetrachloroterephthalate plus CIPC provides the best control since CIPC controls some of the galinsoga and the dimethyl 2,3,5,6-tetrachloroterephthalate provides residual control of the other two major weeds.

EXAMPLE 9

Following the general test procedure of Example 8, dimethyl 2,3,5,6-tetrachloroterephthalate and CIPC are applied to replicate soil plots in which onion transplants, variety Hybrid Sweet Spanish, had been planted two days prior to treatment. The amount of the aqueous dispersion wettable powder formulation of dimethyl 2,3,5,6-tetrachloroterephthalate (Example 1) applied is equivalent to 4 pounds active chemical per acre; the emulsifiable concentrate containing 4 pounds CIPC per gallon is applied at a rate equivalent to 2 pounds per acre. A tank mix is prepared containing 4 pounds of the wettable powder formulation of Example 1 and a quantity of the CIPC emulsifiable concentrate equivalent to 2 pounds CIPC per 50 gallons of water. This mix is applied to replicate plots at a rate equivalent to 4 pounds per acre dimethyl 2,3,5,6-tetrachloroterephthalate and 2 pounds per acre of CIPC. Weeds in the soil plots include pigweed, smartweed, ragweed, purslane, galinsoga, and barnyard grass. Estimates are made on weed stand in the onion beds 28 days after treatment and the percent control is calculated based on weed stand in untreated check plots. The check plots are 94% covered by weeds. The results are set forth in Table IV.

*Table IV*

| Material | Dosage, lbs./acre | Percent weed control based on mean of five independent estimates |
|---|---|---|
| Dimethyl 2,3,5,6-tetrachloroterephthalate | 4 | 36 |
| CIPC | 2 | 41 |
| Dimethyl 2,3,5,6-tetrachloroterephthalate plus CIPC | 4+2 | 82 |

The combination of dimethyl 2,3,5,6-tetrachloroterephthalate and CIPC affords the best control over the wide spectrum of weeds.

EXAMPLE 10

A tank mix of dimethyl 2,3,5,6-tetrachloroterephthalate and CIPC is prepared by mixing the two materials in a ratio of 8 lbs. of the 50% wettable powder of Example 1 to 2 quarts of an emulsifiable concentrate of CIPC containing 4 lbs. active material per gallon. This mix provides an effective control against weeds in soybean crops when applied at a rate equivalent to 4 lbs. of dimethyl 2,3,5,6-tetrachloroterephthalate and 2 lbs. of CIPC per acre.

EXAMPLE 11

Lima beans, variety Fordhook 242, are treated with Captan and planted using a tractor equipped with two seeders that are adjusted to provide 3 feet of space between rows. An aqueous dispersion of the 50% wettable formulation of dimethyl 2,3,5,6-tetrachloroterephthalate (Example 1) is applied, at a rate equivalent to 4 lbs. per acre, to 3 replicate plots of the planted area, which are 3' x 30' is size. A quantity of emulsifiable concentrate containing 5 lbs. of DNBP (4,6-dinitro-o-sec-butylphenol) per gallon is applied to 3 other replicate plots at a rate equivalent to 2 lbs. DNBP per acre. A tank mix is prepared which contains 4 lbs. of the 50% wettable powder formulation of Example 1 and 2 lbs. of DNBP. This mix is applied to three additional replicate plots at a rate which provides a concentration of 4 lbs. dimethyl 2,3,5,6-tetrachloroterephthalate and 2 lbs. DNBP per acre. The major weeds in the soil plots are pigweed, barnyard grass, and crabgrass. Forty-nine days after treatment, estimates are made on the weed stand in the treated soil plots, and the percent control is calculated, based on weed stand in untreated check plots. The check plots are 98% covered by the weeds. The test results are as follows:

*Table V*

| Material | Dosage, lbs./acre | Percent weed control based on mean of four independent estimates |
|---|---|---|
| Dimethyl 2,3,5,6-tetrachloroterephthalate | 4 | 30 |
| DNBP | 2 | 6 |
| Dimethyl 2,3,5,6-tetrachloroterephthalate plus DNBP | 4+2 | 54 |

The percent weed control, obtained by applying the mixture of dimethyl 2,3,5,6-tetrachloroterephthalate and DNBP in the above proportions, indicates the synergistic effect of the combined herbicidal composition, since the control realized is greater than expected if the additive effects of the two chemicals, employed separately, are considered.

EXAMPLE 12

A tank mix of 2,3,5,6-tetrachloroterephthalate and DNBP is prepared by mixing the materials in a ratio of 8 lbs. of the 50% wettable powder of Example 1 to 5 pints of an emulsifiable concentrate of DNBP containing five lbs. of DNBP per gallon. This mix provides an effective control against weeds in soybeans when applied at a ratio equivalent to four lbs. dimethyl 2,3,5,6-tetrachloroterephthalate and three lbs. DNBP per acre.

EXAMPLE 13

Sesone is available as a water soluble powder containing 90% of sodium 2-(2,4-dichlorophenoxy) ethyl sulfate. A tank mix of this material and dimethyl 2,3,5,6-tetrachloroterephthalate is prepared by mixing the two materials in a ratio of 8 lbs. of the 50% wettable powder of Example to 2¼ lbs. of Sesone. This mix provides an effective control against weeds in nursery stock when applied at a rate equivalent to 4 lbs. dimethyl 2,3,5,6-tetrachloroterephthalate and 2 lbs. Sesone per acre.

EXAMPLE 14

Simazine is available as a wettable powder containing 80% of 2-chloro-4,6-bis(ethylamino)-s-triazine. A tank mix of this material and dimethyl 2,3,5,6-tetrachloroterephthalate is prepared by mixing the two materials in a ratio of 8 lbs. of the 50% wettable power of Example 1 to 2 lbs. of the Simazine. This mix provides an effective weed control in nursery stock and corn when applied at a rate equivalent to 4 lbs. dimethyl 2,3,5,6-tetrachloroterephthalate and 1 lb. of Simazine per acre.

EXAMPLE 15

Dalapon is available as the 85% sodium salt of 2,2-dichloropropionic acid. A tank mix of this material and dimethyl 2,3,5,6-tetrachloroterephthalate is prepared by mixing the two materials at a ratio of 8 to 12 lbs. of the 50% wettable powder of Example 1 to 1½ lbs. of Dalapon. This mix provides an effective control against weeds and particularly quack grass when applied at a rate equivalent to 4 to 6 lbs. of dimethyl 2,3,5,6-tetrachloroterephthalate and 1 lb. of Dalapon per acre.

EXAMPLE 16

This test determines the weed-controlling efficiency of dimethyl 2,3,5,6-tetrachloroterephthalate combined with Alanap (available as a wettable powder containing 90% N-1-naphthylphthalamic acid). The test area is freshly cultivated and then divided into equal blocks as replicates. Eight of the plots are treated by spraying with an aqueous dispersion of the 50% wettable powder of dimethyl 2,3,5,6-tetrachloroterephthalate (Example 1) as a concentration of 2 lbs. per acre. A dispersion of Alanap is then applied to four of the treated plots, and to four additional ones at a concentration equivalent to 2 lbs. active chemical per acre. An untreated area is also included as a check plot. This procedure provides a series of subplots, one-third of which have received a combination treatment.

Weed control in the plots is evaluated 31 and 42 days after treatment, and the percent control is calculated, based on weed stand in the untreated check plot. The check plot is 97% covered by weeds in 31 days, and 99% covered in 41 days.

Using this procedure, the following results are obtained:

*Table VI*

| Material | Dosage, lbs./acre | Percent weed control based on mean of 4 independent estimates | |
|---|---|---|---|
| | | 31 days | 42 days |
| Dimethyl 2,3,5,6-tetrachloroterephthalate | 2 | 36 | 7 |
| Alanap | 2 | 34 | 9 |
| Dimethyl 2,3,5,6-tetrachloroterephthalate plus Alanap | 2+2 | 92 | 70 |

The percent control obtained with the admixture of dimethyl 2,3,5,6-tetrachloroterephthalate and Alanap indicates the synergistic effect of the combination, and its efficiency over a longer time period. Weed control is greater than is expected, if the additive effects of the compounds, used separately, are considered.

EXAMPLE 17

A tank mix of Alanap (wettable powder containing 90% N-1-naphthylphthalamic acid) and dimethyl 2,3,5,6-tetrachloroterephthalate is prepared by mixing the two materials at a ratio of 8 lbs. of the 50% wettable powder of Example 1 to 2½ lbs. of Alanap. This mix provides an effective control against weeds in soybeans when applied at the rate equivalent to 4 lbs. of dimethyl 2,3,5,6-tetrachloroterephthalate and 2 lbs. of Alanap per acre.

EXAMPLE 18

Falone is available as an emulsion containing tris(2,4-dichlorophenoxy ethyl)phosphite. A tank mix of this material and dimethyl 2,3,5,6-tetrachloroterephthalate is prepared by mixing the two materials. This mix provides an effective control of weeds in peanut crops when applied at a rate equivalent to 4 lbs. dimethyl 2,3,5,6-tetrachloroterephthalate and 2 lbs. of Falone per acre.

EXAMPLE 19

Dimethyl 2,3,5,6-tetrachloroterephthalate and Stoddard solvent in a ratio of about 1 lb. for each 5 to 10 gal. when applied to a carrot patch at a rate of about 8 lbs. dimethyl 2,3,5,6-tetrachloroterephthalate and 40 to 80 gallons of Stoddard solvent per acre provide both pre-emergence and post-emergence control of weeds. This mixture, when applied in a single application, requires that the dimethyl 2,3,5,6-tetrachloroterephthalate be formulated in some manner other than the wettable powder of Example 1.

One satisfactory method is to apply the two materials in separate application.

It is to be understood that although the invention has been described with specific reference to particular embodiments thereof it is not to be so limited since changes and alterations therein may be made which are within the full intended scope of this invention as defined by the appended claims.

What is claimed is:

1. The method of regulating the growth of broadleaf weeds which comprises applying to the soil and weeds a herbicidal amount of a mixture of dimethyl 2,3,5,6-tetrachloroterephthalate and 2,4-dichlorophenoxy acetic acid, the ingredients being employed in such amounts as to be mutually activating.

2. A composition for regulating the growth of undesirable broadleaf species comprising a major proportion of an inert solid diluent, a minor amount of a surface active agent and a herbicidal amount of a mixture of dimethyl 2,3,5,6-tetrachloroterephthalate and 2,4-dichlorophenoxy acetic acid, the active ingredients being employed in such amounts as to be mutually activating.

3. The composition of claim 2 wherein the mixture contains about 80 percent, by weight, of dimethyl tetrachloroterephthalate and about 20 percent, by weight, of 2,4-dichlorophenoxy acetic acid.

4. The method of claim 1 wherein the mixture contains about 80 percent, by weight, of dimethyl 2,3,5,6-tetrachloroterephthalate and about 20 percent, by weight, of 2,4-dichlorophenoxy acetic acid.

References Cited by the Examiner

UNITED STATES PATENTS

| | | | |
|---|---|---|---|
| 2,709,648 | 5/55 | Ryker et al. | 71—2.6 |
| 2,861,096 | 11/58 | Pumpelly | 71—2.3 |
| 2,923,634 | 2/60 | Lindemann | 71—2.6 |
| 3,112,342 | 11/63 | Luckenbaugh | 71—2.6 X |

FOREIGN PATENTS 830,431   2/52   Germany.

OTHER REFERENCES

Weeds, vol. 8, July 1960, No. 3, pages 490–491.

JULIAN S. LEVITT, *Primary Examiner*.

MAURICE A. BRINDISI, *Examiner*.